(12) United States Patent
Aalto

(10) Patent No.: US 7,519,251 B2
(45) Date of Patent: Apr. 14, 2009

(54) OPTICAL FIBER WITH MODE SINK

(75) Inventor: Timo Aalto, Espoo (FI)

(73) Assignee: Valtion Teknillinen Tutkimus Keskus, Espoo (FI)

( * ) Notice: Subject to any disclaimer, the term of this patent is extended or adjusted under 35 U.S.C. 154(b) by 0 days.

(21) Appl. No.: 11/630,320

(22) PCT Filed: Jul. 9, 2004

(86) PCT No.: PCT/FI2004/000444

§ 371 (c)(1),
(2), (4) Date: Jun. 4, 2007

(87) PCT Pub. No.: WO2006/005787

PCT Pub. Date: Jan. 19, 2006

(65) Prior Publication Data

US 2007/0297738 A1    Dec. 27, 2007

(51) Int. Cl.
*G02B 6/26* (2006.01)
*G02B 6/02* (2006.01)

(52) U.S. Cl. .................. 385/50; 385/29; 385/123

(58) Field of Classification Search .............. None
See application file for complete search history.

(56) References Cited

U.S. PATENT DOCUMENTS 3,813,141 A    5/1974    Miller 3,899,235 A    8/1975    Arnaud et al.
4,815,079 A  *  3/1989    Snitzer et al. ................ 372/6

FOREIGN PATENT DOCUMENTS

WO    WO 02/06866 A2    1/2002

OTHER PUBLICATIONS

Kaiser, P.; Marcatili, E.A.J.; Miller, S.E.: "B.S.T.J. Brief, A New Optical Fiber", *The Bell System Technical Journal*, vol. 52, No. 2, Feb. 1973, pp. 265-269.
Marcatili, E.A.J.: "Slab-Coupled Waveguides", *The Bell System Technical Journal*, vol. 53, No. 4, Apr. 1974, pp. 645-674.

(Continued)

*Primary Examiner*—Omar Rojas
(74) *Attorney, Agent, or Firm*—Frommer Lawrence & Haug LLP; Ronald R. Santucci

(57) ABSTRACT

The present invention concerns an optical fiber acting as a slab-coupled waveguide. The optical fiber has a cross-section comprising a core (1), which is two dimensional and responsible for the horizontal confinement of the fiber's fundamental mode. A slab (2) is placed in the vicinity of the core (1). The slab (2) extends substantially in a plane, acts as a mode sink for the core, and is at least three times wider than the core (1). A cladding (3) surrounds the core (1) and the slab (2). The cladding (3) is made of one or several materials with refractive indices lower than the core and slab materials. The core (1), slab (2) and cladding (3) and any other protective or supportive structures attached to them form an overall structure that determines the mechanical properties of the fiber. The cross-section of the fiber is formed to make the fiber significantly more flexible in the direction perpendicular to the plane of the slab than in the plane of the slab.

16 Claims, 3 Drawing Sheets

OTHER PUBLICATIONS

Arnaud, J.A.: "Transverse Coupling in Fiber Optics Part II: Coupling to Mode Sinks", *The Bell System Technical Journal*, vol. 53, No. 4, Apr. 1974, pp. 675-696.

Soref, Richard A.; Schmidtchen, Joachim; Petermann, Klaus: Large Single-Mode Rib Waveguides in GeSi-Si and Si-on-SiO$_2$, *IEEE Journal of Quantum Electronics*, vol. 27, No. 8, Aug. 1991, pp. 1971-1974.

Aalto, Timo; Harjanne, Mikko; Kapulainen, Markku; Heimala, Paivi; Leppihalme, Matti: "Development of silicon-on-insulator waveguide technology", *Proc. SPIE*, 5355, 2004, 15 pages.

Search Report issued by European Patent Office on Dec. 5, 2008 for corresponding European application 04742187.0.

* cited by examiner

US 7,519,251 B2

OPTICAL FIBER WITH MODE SINK

This application is a 371 of PCT/FI2004/000444 filed on Jul. 9, 2004, published on Jan. 19, 2006 under publication number WO 2006/005787 A1.

FIELD OF THE INVENTION

The present invention relates to an optical fiber as defined in the preamble of claim 1.

BACKGROUND OF THE INVENTION

From the prior art is known an optical fiber acting as a slab-coupled waveguide. The cross-section of such a fiber comprises a core, which is two-dimensional and responsible for the horizontal confinement of the fiber's fundamental mode. A slab is placed in the vicinity of the core for acting as a mode sink for the core. The width of the slab is at least three times of the width of the core. A cladding surrounds the core and the slab. The cladding is made of one or several materials with refractive indices lower than the core and slab materials. The core, the slab and the cladding and any other protective or supportive structure attached to them together form an overall structure which determines the mechanical properties of the fiber.

Such rib fibers, as well as slab-coupled waveguides in general, were invented already in the early 1970s as is described in the literature:

1) P. Kaiser et al., "A new optical fiber", *The Bell System Technical Journal*, 52, pp. 265-269, 1973, 2) E. A. J. Marcatili, "Slab-coupled waveguides", *The Bell System Technical Journal*, 53, pp. 645-674, 1974, and 3) J. A. Arnaud, "Transverse coupling in fiber optics Part II: Coupling to mode sinks", *The Bell System Technical Journal*, 53, pp. 675-696, 1974.

Their main advantages were identified already then, namely their insensitivity to wavelength and scaling of dimensions, as well as their ability to provide single-moded operation with high refractive index contrast and large core dimensions. The rib fibers were seen to avoid the problems that were then associated with alternative fiber technologies, especially the difficulty in providing fibers with small and accurate refractive index differences. The proposed and demonstrated rib fibers had a core and slab made of one homogeneous piece of glass, surrounded by an air cladding, and thus called "single-material fibers". Their sensitivity to bending in the direction of the slab (horizontally) was carefully studied and it was already then recognized that the rib fibers could have a shorter tolerable bending radius in the perpendicular (vertical) direction. However, no detailed analysis of vertical bending was carried out at that time.

During and after the 1970s, alternative fiber structures based on doped glass were developed further and they provided much better results than the "single-material fibers". The rib fibers were then forgotten, probably because they had higher scattering and bending losses and they were more fragile than the alternative fiber structures. Presently circular symmetric fibers with small refractive index differences based on glass doping clearly dominate the fiber optic market, while the "single-material fibers" and rib fibers are in practice totally forgotten.

Present fiber technology is quite mature, but the continuous increase of channels in wavelength division multiplexing (WDN) and growing interest on high-power fibre lasers has generated a need for fibers with large mode area (LMA) and, thus, reduced nonlinear effects, but only one or few propagating modes. These contradicting requirements are difficult to fulfill with conventional fibers. Coiling with a fixed radius of curvature can be used to eliminate the higher order modes without adding too much bending losses for the fundamental mode. However, it is not very convenient to have a fixed radius of curvature. Therefore, a novel solution is needed to provide fibers with large mode area (i.e. large core), small number of modes (preferably single-moded), small propagation loss for the fundamental mode, and insensitivity to bending.

On planar substrates, such as silicon and compound semiconductor wafers, the rib structure and slab-coupled waveguides in general, have become a very common solution. Their main advantage there is the ability to tailor the effective index difference, confinement and number of modes in a waveguide by the waveguide dimensions, instead of changing the refractive indices of the materials. For example, in silicon waveguides a core with reactangular cross-section should have a thickness and width well below 0.5 µm in order to have single-moded operation. A silicon rib waveguide can be single moded even with the thickness and width well above 10 µm. The waveguiding properties of the rib structure and slab-coupled waveguides in general, are discussed thoroughly in literature, e.g. in:

4) R. A. Soref, J. Schmidtchen, K. Petermann, "Large single-mode rib waveguides in GeSi—Si and Si-on-SiO2", IEEE J. Quantum Electron. 27, pp. 1971-1974, 1991, 5). Aalto et al., "Fabrication and characterization of waveguide structures on SOI", *Proceedings of SPIE*, 4944, pp. 183-194, 2003, and 6) T. Aalto et al., "Development of silicon-on-insulator waveguide technology", Accepted for publication in *Proceedings of SPIE*, 5355, 2004.

Based on the experimental work carried out with slab-coupled waveguides on planar substrates, the main disadvantage is their sensitivity to bending, which leads to the use of very long bending radii and poor miniaturization. The fundamental reason for this is the horizontal spreading of the modes into the slab, i.e. the same mechanism that enables the single-moded operation. The effect becomes stronger when the waveguide dimensions increase, thus limiting the waveguide size. In planar technology there is no way to take advantage of the smaller sensitivity to bending in the vertical direction.

OBJECT OF THE INVENTION

The object of the present invention is to overcome the above-mentioned drawbacks.

The specific object of the invention is to provide an optical fiber with a large core, small propagation loss, and insensitivity to the radius of bending curvature, and more specifically, a fiber wherein the propagation loss of the fundamental mode is significantly less sensitive to fiber bending than in the traditional fibers. Further, the object of the invention is to provide an optical fiber wherein the number of propagating modes is significantly less sensitive to fiber bending than in traditional fibers. Further, the purpose of the invention is to provide an optical fiber which due to its bending and low-loss characteristics is very suitable for high-power fibre lasers.

SUMMARY OF THE INVENTION

The optical fiber of the invention is characterised in what is disclosed in claim 1.

The invention concerns an optical fiber acting as a slab-coupled waveguide and having a cross-section comprising a core, which is two dimensional and responsible for the horizontal confinement of the fiber's fundamental mode; a slab which is placed in the vicinity of the core, extends substantially in a plane, acts as a mode sink for the core, and is at least three times wider than the core; and a cladding surrounding the core and the slab, said cladding being made of one or several materials with refractive indices lower than the core and slab materials. The core, slab and cladding and any other protective or supportive structures attached to them form an overall structure which determines the mechanical properties of the fiber.

According to the invention the cross-section of the fiber is formed to make the fiber significantly more flexible in the direction perpendicular to the plane of the slab than in the plane of the slab.

A slab-coupled waveguide is thus formed into a fiber that can bend only in the vertical direction, i.e. perpendicularly to the slab. The resulting fiber with a slab-coupled core will then avoid the problems associated with horizontal bending (in the plane of the slab), while maintaining the ability to provide single-moded operation even with large dimensions and high refractive index contrast. Preferably the fiber is made of doped glass in a similar manner as the conventional glass fibers. However, the cladding may be at least partially made of other materials, which can be solid, liquid or even gaseous. The main element in the invention is the combination of a slab-coupled waveguide and an overall fiber structure that prevents the fiber from bending in the plane of the slab. This approach avoids the main problems associated with slab-coupled waveguides, while maintaining their main benefits.

The advantage of the invention is that the propagation loss of the fundamental mode is significantly less sensitive to the radius of the fiber bending curvature than in traditional fibers with similar dimensions and same number of propagating modes. Also with respect to traditional fibers the number of propagating modes is significantly less sensitive to the radius of the fiber bending curvature. Compared to conventional fibers the fiber according to the invention can be single-moded with large dimensions and larger refractive index difference. The optical fiber according to the invention is therefore very suitable to be used in high-power fibre lasers where large mode area and freedom in glass doping are particularly valuable. Because the fiber is significantly more flexible in the direction perpendicular to the plane of the slab than in the plane of the slab, the disadvantageous bending in the plane of the slab is practically hindered.

In one embodiment of the optical fiber the overall structure of the fiber's cross-section is significantly wider than it is thick.

In one embodiment of the optical fiber the higher order modes are cut off due to the presence of the slab and the effective index difference is significantly smaller than the refractive index difference between the core and the cladding. Thus, modal behaviour of the fiber is at least similar to that of a rib waveguide on a planar substrate or a previously known rib fiber. The difference with respect to the said known rib waveguides and rib fibers is that the fiber bends only in the vertical direction, i.e. perpendicularly to the plane of the slab.

In one embodiment of the optical fiber one lateral edge of the slab is in the vicinity of the core while the other lateral edge extends far away from the core, so that the slab extends only to one direction away from the core.

In one embodiment of the optical fiber the core is in the vicinity of the center region of the slab and both lateral edges of the slab extend to substantially opposite directions away from the core.

In one embodiment of the optical fiber one, two, three or four separate slabs are placed into the vicinity of the core, each having at least one lateral edge extending far away from the core.

In one embodiment of the optical fiber the lateral edges of the slab are tilted or bent towards the direction to which a shorter tolerable bending radius of the curvature of the fiber is desired, thus reducing the difference in bending sensitivities in the two opposite directions of high flexibility.

In one embodiment of the optical fiber the core and slab materials have substantially the same refractive index.

In one embodiment of the optical fiber the core and slab materials have different refractive indices.

In one embodiment of the optical fiber the core, the slab, or both are made of more than one material. In one embodiment of the optical fiber the core and slab are placed directly on top of each, thus forming a rib structure.

In one embodiment of the optical fiber the core, slab and at least part of the cladding is made of doped glass.

In one embodiment of the optical fiber the optical fiber is a rare earth doped fiber.

In one embodiment of the optical fiber only the core is rare earth doped.

In one embodiment of the optical fiber the total thickness of the core and slab is 5-100 µm, preferably 10-50 µm.

In one embodiment of the optical fiber the fiber is arranged to be twisted around its longitudinal axis for changing the direction of bending curvature.

In one embodiment of the optical fiber the fiber is tapered along its length so that the proportions of the dimensions of the fiber are maintained along the taper.

BRIEF DESCRIPTION OF THE DRAWINGS

The accompanying drawings, which are included to provide a further understanding of the invention and constitute a part of this specification, illustrate embodiments of the invention and together with the description help to explain the principles of the invention. In the drawings.

DETAILED DESCRIPTION OF THE INVENTION

Reference will now be made in detail to the embodiments of the present invention, examples of which are illustrated in the accompanying drawings.

FIGS. 1-12 show optical fibers which act as slab-coupled waveguides and in which the mutual arrangement of core and slab vary.

In all embodiments the optical fiber has a core 1, which is responsible for the horizontal confinement of the fiber's fundamental mode. In all FIGS. 1-12 the core is illustrated as a simple rectangle, but it should be noted that the core may have an arbitrary two-dimensional shape, and it may be e.g. circular. It may also be made of several materials.

Further, the fiber comprises a slab 2 which is placed in the vicinity of the core. The slab 2 extends substantially in a plane. The slab acts as a mode sink for the core 1 and is at least three times wider than the core 1. In all FIGS. 1-12 the slab is illustrated as a simple rectangle, although it can have a more complicated structure. In particular, the junction between the core and the slab can be more complicated than the illustrated abrupt junction and the other (further) lateral end of the slab may also be constructed in various ways. The slab 2 may be made of more than one material and it may include material(s)

used in the core 1. In any case, the basic principle of the fiber acting as a slab-coupled waveguide is that the fundamental mode sees a sufficient effective index difference between the core and the slab, and is therefore confined into the two-dimensional core with only exponentially decaying field tails in the slab region, while the higher order modes extend much further into the slab and, thus, leak from the core into the slab.

A cladding 3 surrounds the core 1 and the slab 2. The cladding 3 is made of one or several materials having refractive indices lower than the materials of the core 1 and the slab 2.

Core 1, slab 2 and cladding 3 and any other protective or supportive structure attached to them all form an overall structure which determines the mechanical properties of the fiber.

In all embodiments of the FIGS. 1-12 the cross-section of the fiber is significantly wider than it is thick which makes the fiber significantly more flexible in the direction perpendicular to the plane of the slab 2 than in the plane of the slab 2. The higher order modes are cut off due to the presence of the slab 2 and the effective index difference is significantly smaller than the refractive index difference between the core 1 and the cladding 3. In all FIGS. 1-2 the overall shape of the fiber cross-section is a rectangle having rounded edges, although this is not the only possible shape that can be used.

Figure 1:
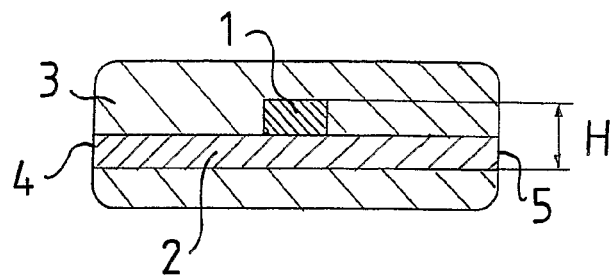
FIGS. 1-12 each show a schematic representation of the cross-section of an embodiment of the optical fiber of the invention.

FIG. 1 shows an optical fiber which has a classical rib or strip shape. Core 1 is attached on top of the slab 2 in its center region so that the lateral edges 4, 5 of the slab extend to substantially opposite directions at equal distances away from core 1.

Figure 2:
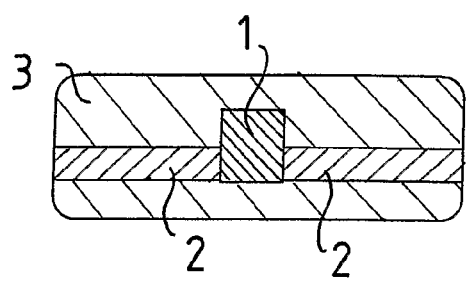

FIG. 2 shows an optical fiber comprising two slabs 2 in a common plane the opposite lateral edges of slabs 2 abutting and being attached to core 1 which is between slabs 2. Core 1 is thicker than slabs 2 core 1 being asymmetrically in the vertical direction.

The fibers of FIGS. 1 and 2 both have a classical rib shape and eliminate all higher order vertical modes with appropriate ratio of dimensions and refractive indices, while other fiber types may have difficulties especially in eliminating the first higher order vertical mode.

Figure 3:
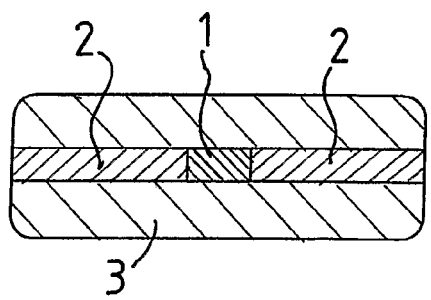

FIG. 3 shows an optical fiber comprising two slabs 2 in a common plane the opposite lateral edges of the slabs 2 abutting and being attached to core 1 which is between slabs 2. The thickness of the core 1 equals the thickness of slabs 2. This form causes confinement only due to the refractive index difference between core 1 and slab 2. This structure is vertically symmetrical. It does not eliminate higher order vertical modes as efficiently as the rib structure.

Figure 4:
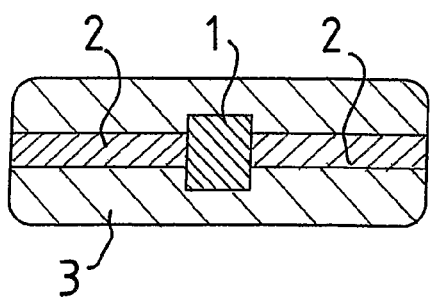

FIG. 4 shows an optical fiber comprising two slabs 2 in a common plane the opposite lateral edges of the slabs 2 abutting and being attached to core 1 which is between slabs 2. Core 1 is thicker than slabs 2. This structure is vertically symmetrical. It does not eliminate higher order vertical modes as efficiently as the asymmetric rib structure.

Figure 5:
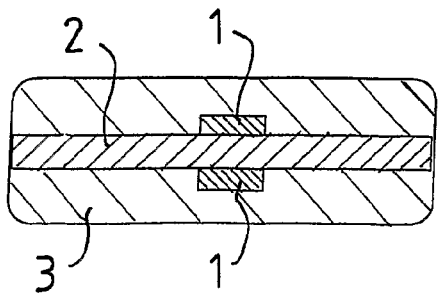

FIG. 5 shows an optical fiber comprising one slab 2 and two cores 1 on opposite sides of the slab 2 in the center of the slab 2. This structure is vertically symmetrical. It does not eliminate higher order vertical modes as efficiently as the asymmetric rib structure.

Figure 6:
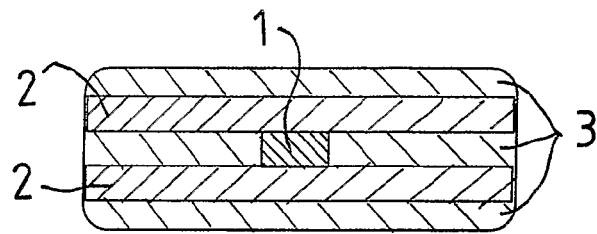

FIG. 6 shows an optical fiber comprising one core 1 and two slabs 2 on opposite sides of the core 1 which is in the center and between slabs 2. This structure is vertically symmetrical. It does not eliminate higher order vertical modes as efficiently as the asymmetric rib structure.

Figure 7:
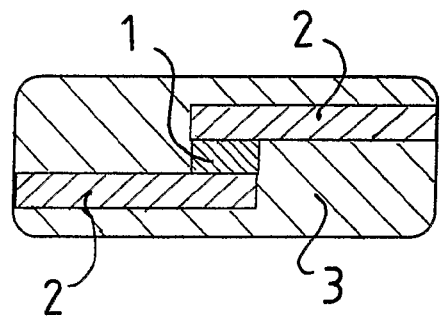

FIG. 7 shows an optical fiber comprising one core 1 and two slabs 2 on opposite sides of the core 1. Slabs 2 have one lateral edge 4 in the vicinity of the core 1 while the other lateral edge 5 of the slab 2 extends far away from core 1, so that slabs 2 extend to opposite directions away from core 1.

Figure 8:
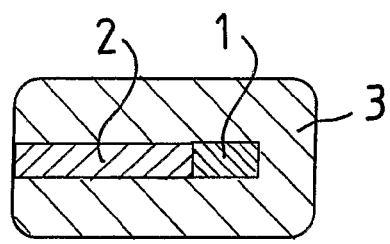

FIG. 8 shows an optical fiber comprising core 1 and slab 2. Core 1 is placed in the plane of the slab 2 and directly attached to one lateral edge of the slab 2. This structure is vertically symmetrical. It does not eliminate higher order vertical modes as efficiently as the asymmetric rib structure.

Figure 9:
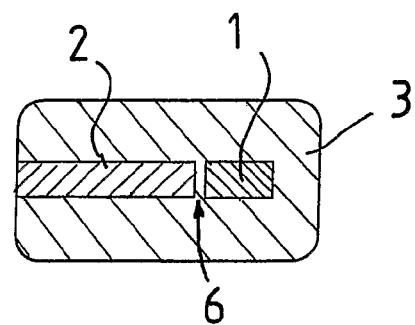

FIG. 9 shows an optical fiber comprising core 1 and slab 2. Core 1 is placed in the plane of the slab 2 close to slab 2 so that they are not directly attached to each other but have between them a gap 6 providing sufficient optical coupling between core 1 and slab 2.

Figure 10:
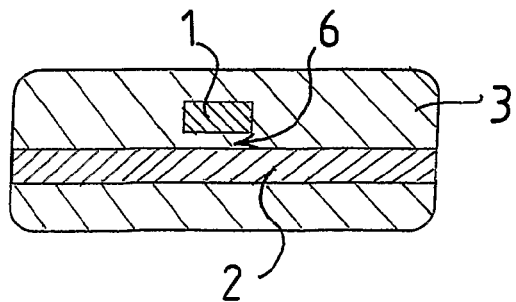

FIG. 10 shows an optical fiber which has a classical rib or strip shape. Core 1 is on top of the slab 2 in its center region close to slab 2 so that the lateral edges 4, 5 of the slab extend to substantially opposite directions at equal distances away from core 1. Core 1 and slab 2 are not directly attached to each other but have between them a gap 6 providing sufficient optical coupling between core 1 and slab 2.

Figure 11:
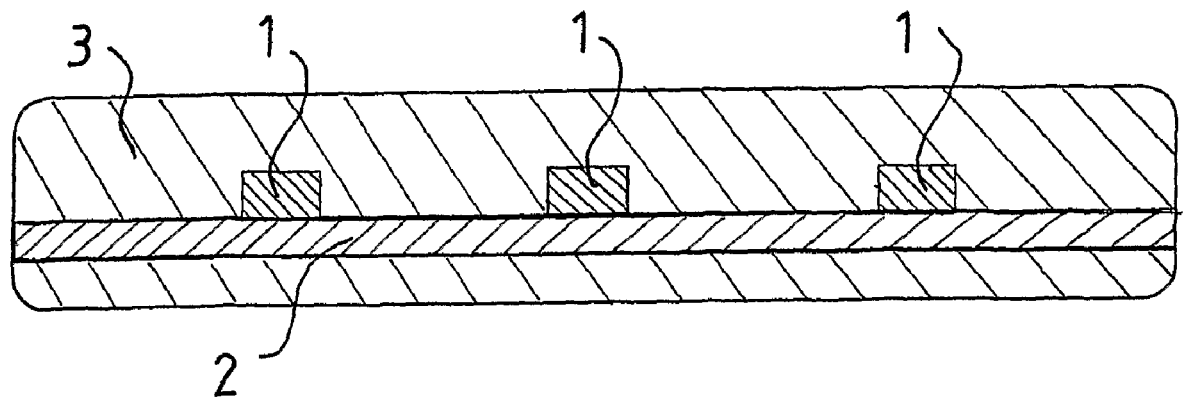

FIG. 11 shows an optical fiber comprising a plurality of cores 1 attached on top of the slab 2.

Figure 12:
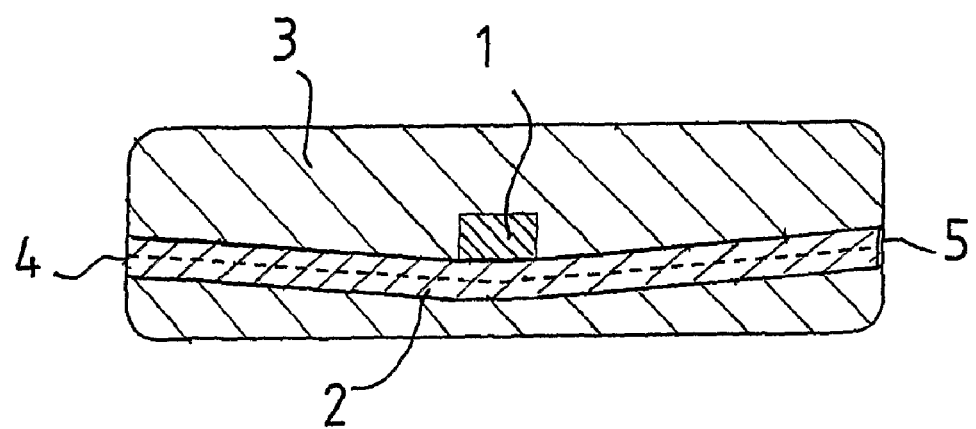

FIG. 12 shows an optical fiber of the type as presented in FIG. 1 with the difference that the lateral edges 4, 5 of the slab 2 are tilted or bent towards the direction to which a shorter tolerable bending radius of the curvature of the fiber is desired, thus reducing the difference in bending sensitivities in the two opposite directions of high flexibility. In FIG. 12 the tilting of the slab enables a shorter radius of curvature upwards, in which direction the structure would otherwise, i.e. without tilting, be more sensitive to bending than in the opposite direction (downwards).

Core 1, slab 2 and at least part of the cladding 3 is preferably made of doped glass. The optical fiber can be a rare earth doped fiber. In some embodiment only the core is rare earth doped. The total thickness H of the core and slab is 5-100 μm, preferably 10-50 μm. The core is preferably positioned approximately to the center of the overall structure, but it may also be positioned off-center, e.g. to facilitate the input coupling of pump light in a rare earth doped fiber.

The fiber can be twisted around its longitudinal axis for changing the direction of bending curvature. The fiber can also be tapered along its length so that the proportions of the dimensions of the fiber are maintained along the taper.

Bending of Rib Fibers (Slab-Coupled Fibers):

When the fiber is bent towards the direction of longer tolerable radius of curvature (upwards in FIGS. 1-12), the field of the fundamental mode shifts down towards the outer edge of the bent fiber and spreads horizontally into the slab resulting in bending losses. This can be considered figuratively as the field's response to a centrifugal force associated with the bending. Alternative explanation can be based on the so-called conformal mapping of the bent fiber, which converts it into a straight fiber with a modified refractive index distribution.

According to the first approximation, the convertion increases the refractive indices linearly with respect to the distance from the center of curvature, the slope being inversely proportional to the bending radius. Thus, if the core and the slab have the same refractive index, a decrease in the bending radius has approximately the same effect as if the refractive index of the slab would be increased. Additionally, bending always makes all modes lossy, although some modes may have almost infinitely small losses, and may therefore be called propagating modes.

The bending, thus, causes the field to shift from the core towards the slab, leading to weaker horizontal confinement and increased bending losses. With a sufficiently high refractive index difference of the core and slab with respect to the surrounding cladding, the main limitation for bending comes from the horizontal spreading of the mode fields into the slab, instead of the direct radiation losses from the core into the cladding. In another words, bending pushes the mode fields from the core into a direction that is perpendicular, instead of parallel, with respect to the bending radius. In traditional fibers, the radiation losses appear radially, i.e. parallel to the bending radius.

When the fiber is bent to the opposite direction (down in FIGS. 1-12), the bending "pushes" the field towards the core and away from the slab. In certain configurations, this may even lead to increased confinement, which restrains the increase of bending losses. This is the reason why the bending up and down can have clearly different effect on the number of modes and bending losses of different modes.

Slab is Tilted (or Bent) Towards the Direction of Longer Tolerable Radius of Curvature:

When the fiber is bent towards the direction of longer tolerable radius of curvature (higher sensitivity to bending), the tilting (or bending) of the slab makes the further areas of the slab less attractive to the bent field, thus leading to improved horizontal confinement and reduced bending losses.

When the fiber is bent to the opposite direction, the tilting (or bending) of the slab can lead to increased bending losses. However, with an appropriate design (tilt angle, slab thickness, core dimensions and refractive indices), the tilting (or bending) can be used to reduce the minimum tolerable bending radius in the direction that is more sensitive to bending, while enabling the fiber to be bent at least with the same bending radius also in the opposite direction.

Core Thicker than Slab and in Vertical Alignment with the Slab:

Referring to the embodiments shown in FIGS. 2 and 4, the asymmetry of the rib structure (with a horizontal slab) enables the elimination of not only the horizontal, but also the vertical higher order modes. In a properly designed rib structure all higher order vertical modes have at least one intensity maximum that does not see any refractive index contrast with respect to the slab and they thus couple infinitely wide into the slab resulting in a leaky mode. The disadvantage of the asymmetric rib structure is the asymmetry also in the sensitivity to vertical bending. A vertically symmetric structure naturally has a symmetry also in the sensitivity to vertical bending, but it can not eliminate higher order vertical modes as conveniently as the rib structure. However, it can be used to easily eliminate all but the first two vertical modes, i.e. all vertical and horizontal modes except modes 00 and 01. This is sufficient in many applications. To have weak sensitivity to bending, the core should be thicker than the surrounding slab(s), so that bending effectively pushes the fundamental mode from the slab further into the core.

It is obvious to a person skilled in the art that with the advancement of technology, the basic idea of the invention may be implemented in various ways and the different details described above may be combined in numerous ways. The invention and its embodiments are thus not limited to the examples described above, instead they may vary within the scope of the claims.

The invention claimed is:

1. An optical fiber acting as a slab-coupled waveguide and having a cross-section comprising:

a two dimensional core (1) determining the horizontal confinement of the fiber's fundamental mode, a slab (2) extending substantially in a horizontal plane (2) and being, at least three times wider than the core, the core lying adjacent to the slab outside of it, the slab acting as a mode sink of the core, and a cladding (3) surrounding the core (1) and the slab (2), said cladding being made of one or several materials with refractive indices lower than the core and slab materials, said core, slab and cladding and any other protective or supportive structures attached to them forming an overall structure determining the mechanical properties of the fiber, wherein the cross-section of the fiber is formed to make the fiber significantly more flexible in the direction perpendicular to the plane of the slab than in the plane of the slab.

2. An optical fiber as in claim 1, wherein the fiber's cross-section is significantly wider than it is thick.

3. An optical fiber according to claim 1, wherein the higher order modes are cut off due to the presence of the slab (2), and the effective index difference of the fiber is significantly smaller than the refractive index difference between the core (1) and the cladding (2).

4. An optical fiber according to claim 1, wherein one lateral edge (4) of the slab (2) is in the vicinity of the core (1) while the other lateral edge (5) extends far away from the core, so that the slab extends only to one direction away from the core.

5. An optical fiber according to claim 1, wherein the core (1) is in the vicinity of the center region of the slab (2) both lateral edges (4, 5) of the slab extending to substantially opposite directions away from the core.

6. An optical fiber according to claim 1, wherein one, two, three or four separate slabs (2) are placed into the vicinity of the core (1), each having at least one lateral edge extending far away from the core.

7. An optical fiber according to claim 1, wherein the lateral edges (4, 5) of the slab (2) are tilted or bent towards the direction to which a shorter tolerable bending radius of the curvature of the fiber is desired, thus reducing the difference in bending sensitivities in the two opposite directions of high flexibility.

8. An optical fiber according to claim 1, wherein the materials of the core (1) and the slab (2) have substantially the same refractive index.

9. An optical fiber according to claim 1, wherein the materials of the core (1) and slab (2) have different refractive indices.

10. An optical fiber according to claim 1, wherein the core (1) and slab (2) are placed directly on top of each, thus forming a rib structure.

11. An optical fiber according to claim 1, wherein the core (1), slab (2) and at least part of the cladding (3) is made of doped glass.

12. An optical fiber according to claim 1, wherein the optical fiber is a rare earth doped fiber.

13. An optical fiber according to claim 1, wherein only the core (1) is rare earth doped.

14. An optical fiber according to claim 1, wherein the total thickness (H) of the core (1) and slab (2) is 5-100 μm, preferably 10-50 μm.

15. An optical fiber according to claim 1, wherein the fiber is arranged to enable twisting it around its longitudinal axis for changing the direction of bending curvature.

16. An optical fiber according to claim 1, wherein the fiber is tapered along its length so that the proportions of the dimensions of the fiber are maintained along the taper.

* * * * *